(12) United States Patent
Onodera et al.

(10) Patent No.: US 8,352,858 B2
(45) Date of Patent: Jan. 8, 2013

(54) HIGH-SPEED WEB SERVER

(75) Inventors: Tamiya Onodera, Kanagawa (JP); Toyotaro Suzumura, Kanagawa (JP); Michiaki Tatsubori, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 443 days.

(21) Appl. No.: 12/760,646

(22) Filed: Apr. 15, 2010

(65) Prior Publication Data

US 2010/0269034 A1    Oct. 21, 2010

(30) Foreign Application Priority Data

Apr. 17, 2009   (JP) ................................. 2009-100705

(51) Int. Cl.
*G06F 17/00*   (2006.01)

(52) U.S. Cl. ......... 715/256; 715/271; 715/264; 715/234

(58) Field of Classification Search .................. 715/234, 715/256, 264, 271
See application file for complete search history.

(56) References Cited

FOREIGN PATENT DOCUMENTS

JP       2004-213220 A     7/2004

*Primary Examiner* — Adam M Queler
(74) *Attorney, Agent, or Firm* — Vazken Alexanian (57) ABSTRACT

A high-speed web server that generates an HTML file upon receipt of an HTTP request is described. The server includes an application executor device and an HTTP server device that receives the HTTP request and sends an HTTP response to the HTTP request. A method for sending an HTTP response in a server that generates an HTML file upon receipt of an HTTP request is also provided. The method includes: executing a script; calculating the number of appearances of the string; storing the string in a storage; executing a script when the script is a command for processing a string; replacing the string with reference information; and sending the string file along with the HTML file when it includes reference information for reference to the string file.

5 Claims, 9 Drawing Sheets

| VARIABLE | STRING | COUNTER | FILE NAME |
|----------|--------|---------|-----------|
| $x | aaa | 3 | |
|  | bbb | 4 | |
|  | ccc | 1000 | str_0001 |
| $y | ddd | 1 | |
| ⋮ | ⋮ | ⋮ | ⋮ |

```
<?php
    echo $x; (10KB)
    ..... DIFFERENT PROCESSING 1
    echo $y; (6KB)
    ..... DIFFERENT PROCESSING 2
    echo $z; (7KB)
    ..... DIFFERENT PROCESSING 3
?>
```

FIG. 8 echo $x echo file_get_contents("str_0001");

FIG. 9

| VARIABLE | STRING | COUNTER | FILE NAME |
|---|---|---|---|
| $x | aaa | 3 | |
| | bbb | 4 | |
| | ccc | 1000 | str_0001 |
| $y | ddd | 1 | |
| ⋮ | ⋮ | ⋮ | ⋮ |

FIG. 10

HIGH-SPEED WEB SERVER

CROSS REFERENCE TO RELATED APPLICATION

This application claims priority under 35 U.S.C. 119 from Japanese Patent Application 2009-100705, filed Apr. 17, 2009, the entire contents of which are incorporated herein by reference.

BACKGROUND OF THE INVENTION

1. Field of the Invention

The present invention relates to a technique for increasing the speed of a web server, and particularly to a technique for increasing the speed of a web server that dynamically generates content.

2. Description of the Related Art

Scale-out is known as a technique for improving performance requirements of a web application server (sometimes called a web server below). Scale-out involves increasing the number of servers, and therefore has a problem of high management cost and high power consumption. Accordingly, achieving a single higher-performance web server is still a significant technical challenge. The present invention aims to increase the speed of a general environment of a web server including an HTTP server serving as a frontend and a programming language processor (called a language processor below) serving as a backend. In this configuration which allows dynamic content generation, the language processor is responsible for dynamic HTML generation, and the HTTP server is responsible for returning the generated content to a client, as an HTTP response message. In the case of the PHP language, the language processor and the HTTP server are connected to each other with Apache's mod_php on the same process, and FastCGI on different processes. FastCGI, mod_php, and the like are known as interfaces (SAPI: Server Application Programming Interface) that connect these two components.

For example, there is an approach called Faster FastCGI implemented when FastCGI is used as an SAPI (see, "lighty's lifeFaster FastCGI", [online], Nov. 29, 2006, lighty's life, [searched on Feb. 29, 2008], Internet <URL: http://blog.lighttpd.net/articles/2006/11/29/faster-fastcgi>). In this approach, the PHP language processor writes an execution result on a file assigned in a shared memory (/dev/shm), and passes its file name as an HTTP header (X-LIGHTTPD-tempfile) in the FastCGI protocol. Then, a FastCGI module (mod_php) of the HTTP server sends a message using a sendfile system call of an operating system (OS). It is known, however, that there is overhead in costs for memory copy performed to pass content generated by the language processor to the HTTP server, which accordingly leads to low throughput.

Generally, the web application server as described above performs a series of operations: receiving a request from a client (HTTP client), generating an HTML (HyperText Markup Language) file in response to the request, and returning the generated HTML file to the client. Since the processing is performed switchingly between the HTTP server and the application executor, memory copy is performed multiple times between a user space (user memory) and a kernel space (kernel memory) in memory. In addition, for some operations of the application executor, necessary data is read from the storage, and this read data is also copied.

Such memory copy requires certain processing costs. Accordingly, repetition of redundant memory copy lowers the overall performance of the web application server. The present invention aims to solve the above problem and to improve the operation performance of the web application server by reducing the processing costs of memory copy.

SUMMARY

To achieve the above object, the present invention provides a server apparatus that generates an HTML file upon receipt of an HTTP request. The server includes:

an application executor device that generates the HTML file based on the HTTP request; and an HTTP server device that receives the HTTP request and sends an HTTP response to the HTTP request, the HTTP response including the HTML file generated by the application executor device, wherein:

the application executor device includes means for executing a script in generating the HTML file, for calculating the number of appearances of the string when an instruction code in the script is a command for processing a string, and for storing the string in a storage as a string file when the number of appearances of the string is higher than a preset value, the application executor device further includes means for executing a script in generating the HTML file and replacing the string with reference information for reference to the string file when (i) an instruction code of the script is a command for processing a string and (ii) when the string matches the stored string, and the HTTP server includes means for sending the string file indicated by the reference information along with the HTML file when the HTML file generated by the application executor includes the reference information for reference to the string file.

The present invention further provides a method for sending an HTTP response in a server that generates an HTML file upon receipt of an HTTP request. The method includes the steps of:

executing a script in generating the HTML file;

calculating the number of appearances of the string when an instruction code in the script is a command for processing a string;

storing the string in a storage as a string file when the number of appearances of the string is higher than a preset value;

executing a script in generating the HTML file when an instruction code of the script is a command for processing a string;

replacing the string with reference information for reference to the string file when the string matches the stored string, thereby generating the HTML file; and sending the string file indicated by the reference information along with the HTML file when the generated HTML file includes reference information for reference to the string file.

BRIEF DESCRIPTION OF THE DRAWINGS

For a more complete understanding of the present invention and the advantage thereof, reference is now made to the following description taken in conjunction with the accompanying drawings.

DETAILED DESCRIPTION OF THE PREFERRED EMBODIMENTS

An embodiment of the present invention will be described in detail below with reference to the attached drawings.

System Configuration

Figure 1:
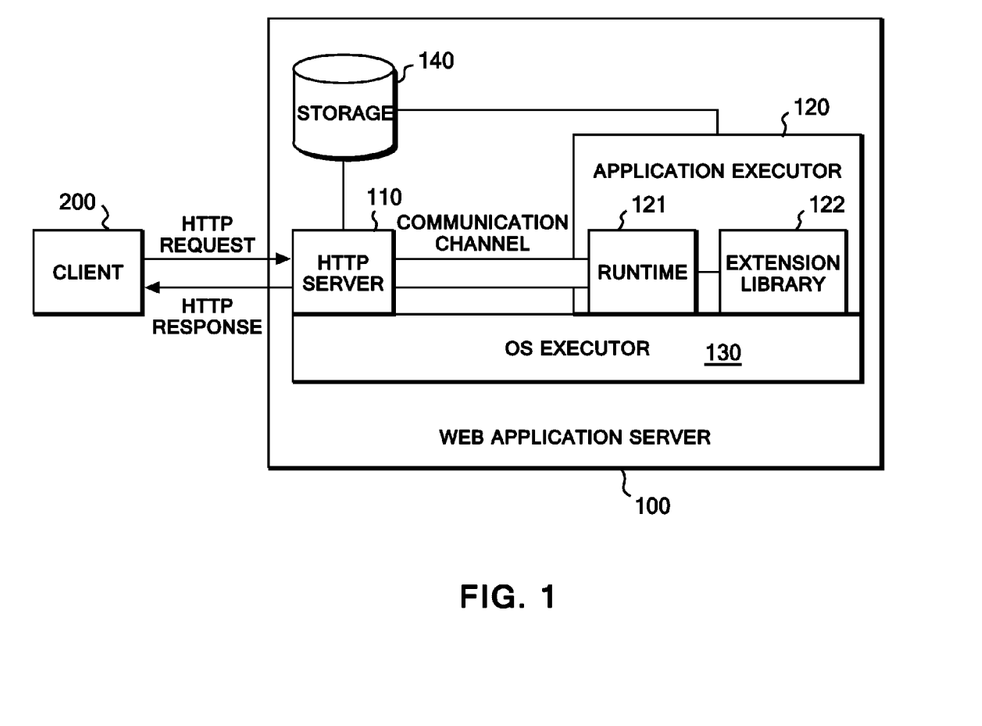
FIG. 1 is a diagram showing a functional configuration of a web application server of the present embodiment.

FIG. 1 is a diagram showing a functional configuration of a web application server of the present embodiment.

A web application server 100 shown in FIG. 1 is implemented by a computer such as a personal computer, and includes an HTTP server 110, an application executor 120, an OS executor 130, and a storage 140. The web application server 100 is connected to a client 200 through a network.

In the present embodiment, a PHP (PHP: Hypertext Preprocessor) language processor is used as the application executor 120. In addition, FastCGI is used as a communication channel (SAPI) between the HTTP server 110 and the application executor 120. As shown in FIG. 1, the application executor 120 includes a regular PHP runtime library (simply called a runtime below) 121 and an extension library 122 that implements a function extended in the present embodiment.

Figure 2:
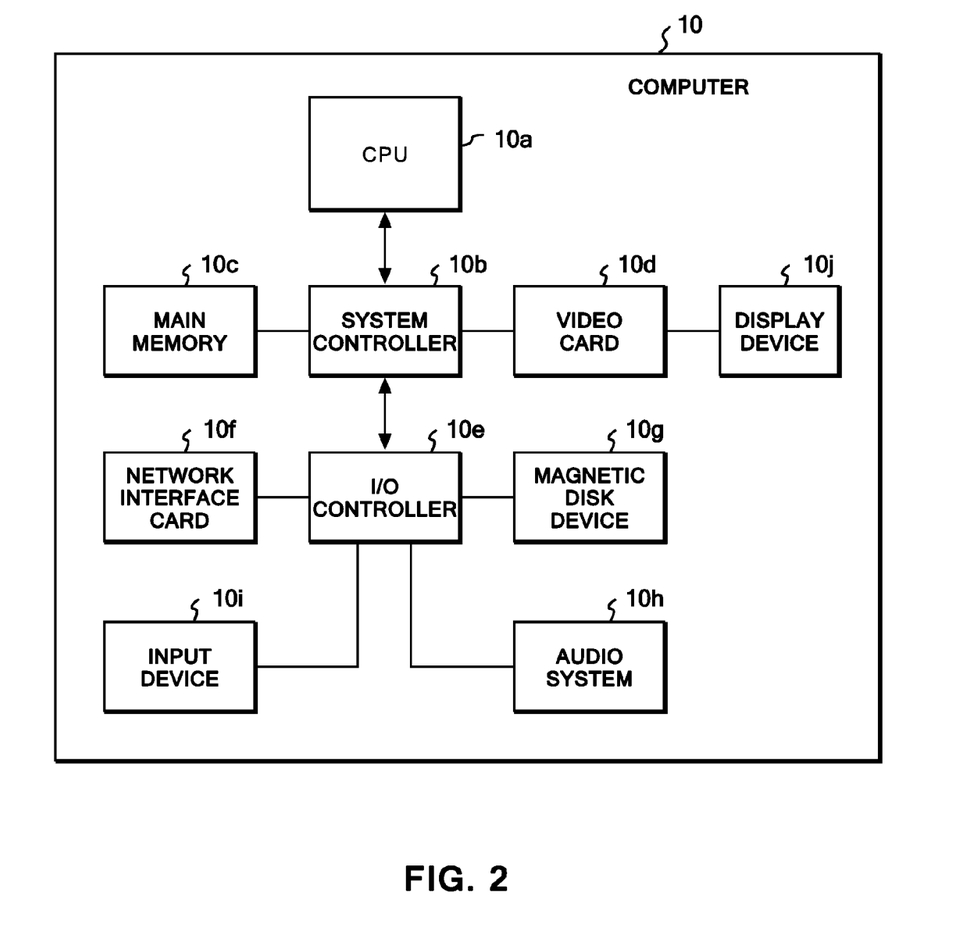
FIG. 2 is a diagram showing an example of a hardware configuration of a computer to which the present embodiment is applied.

FIG. 2 is a diagram showing an example of a hardware configuration of a computer to which the present embodiment is applied.

A computer 10 shown in FIG. 2 includes a central processing unit (CPU) 10a as operation means, as well as a main memory 10c and a magnetic disk device (HDD: Hard Disk Drive) 10g as storage means. If the main memory 10c has enough size, a part of the main memory 10c is used as a RAM disk. String files according to the present invention can be stored in this RAM disk. In addition, the computer 10 includes a network interface card 10f for connection with an external device through a network, a video card 10d and a display device 10j for display output, and an audio system 10h for audio output. The computer 10 further includes an input device 10i such as a keyboard and a mouse.

As shown in FIG. 2, the main memory 10c and the video card 10d are connected to the CPU 10a through a system controller 10b. The network interface card 10f, the magnetic disk device 10g, the audio system 10h, and the input device 10i are connected to the system controller 10b through an I/O controller 10e. These components are connected with various kinds of buses, such as a system bus and an input/output bus. For example, the CPU 10a and the main memory 10c are connected to each other through a system bus or a memory bus. The CPU 10a, the magnetic disk device 10g, the network interface card 10f, the video card 10d, the audio system 10h, the input device 10i, and the like are connected to one another through an input/output bus, such as the Peripheral Components Interconnect (PCI) bus, the PCI Express bus, the Serial ATA (AT Attachment) bus, the Universal Serial Bus (USB) bus, or the Accelerated Graphics Port (AGP) bus.

Note that FIG. 2 only shows a preferred hardware configuration of a computer to which the present embodiment is applied; it is needless to say that the configuration of an actual server is not limited to that shown in FIG. 2. For example, with only a video memory incorporated, instead of the video card 10d, the CPU 10a may process image data. Further, instead of providing the audio system 10h as an independent component, a chipset configuring the system controller 10b or the I/O controller 10e may have the function of the audio system 10h. Furthermore, in addition to the magnetic disk device 10g, a drive using a medium such as an optical disk or a flexible disk may be provided as an auxiliary storage. As the display device 10j, a liquid crystal display is mainly used, but any other types of display may be used.

In the web application server 100 shown in FIG. 1, the functions of the HTTP server 110, the application executor 120, and the OS executor 130 are implemented for example when the CPU 10a executes a program read into the main memory 10c, in the computer shown in FIG. 2. The storage 140 is implemented by the magnetic disk device 10g. Further, a user memory used by the application and a kernel memory used by the OS are implemented by the main memory 10c.

The HTTP server 110 in FIG. 1 is a server that operates on the OS and performs HTTP communication through a network. The HTTP server 110 receives a HTTP request from the client 200, and passes it to the application executor 120. Then, as a HTTP response, the HTTP server 110 sends, back to the client 200, a processing result received from the application executor 120. The HTTP request received from the client 200 is first stored in a socket buffer in the kernel memory, and then is read into the user memory used by the application of the HTTP server 110. The HTTP response, on the other hand, is first stored in the socket buffer of the kernel memory, and then is sent to the client 200. To reduce the load of this memory copy between the user memory and the kernel memory, the HTTP server 110 of the present embodiment executes processing according to the extension function given to the application executor 120. Details of this processing will be described later.

The application executor 120 is a PHP language processor that operates on the OS. In response to the HTTP request received from the HTTP server 110, the application executor 120 dynamically generates an HTML file, using the runtime 121 and the extension library 122. The web application server 100 holds an original HTML file with which to generate a specific HTML file corresponding to the HTTP request. A PHP script is described in this original HTML file, and is executed in response to the HTTP request. The application executor 120 generates an object (web object) by executing this PHP script, and embeds the generated object in the original HTML file. In this way, a specific HTML file corresponding to the HTTP request is generated dynamically.

As shown in FIG. 1, the application executor 120 includes the runtime 121 and the extension library 122. The runtime 121 is a regular runtime library for executing the PHP script. In the application executor 120 of the present embodiment, the runtime 121 also implements a function for reducing the memory copy load. The extension library 122 (called an extension in PHP) implements an auxiliary function used in the mechanism of the present embodiment for reducing the memory copy load. Descriptions will be given later of functions of these libraries and operations of the application executor 120 using these libraries.

The OS executor 130 executes the OS and provides basic functions of the web application server 100. The HTTP server 110 and the application executor 120 operate on that OS. In FIG. 1, the HTTP server 110 and the application executor 120 have the common OS executor 130 for descriptive purposes. Note, however, that the HTTP server 110 and the application executor 120 may operate on their respective operating systems. In other words, the HTTP server and the application server may operate in different machines as long as they communicate with each other according to the FastCGI protocol.

The storage 140 holds the original HTML file with which the application executor 120 dynamically generates a specific HTML file. In addition, the storage 140 holds certain data. This data is written into the HTML file generated by the application executor 120. In the present embodiment, when an HTTP response is to be sent using a function implemented by the extension library 122 of the application executor 120, the HTTP server 110 reads the data from the storage 140, and writes it into the HTML file.

In the web application server 100 thus configured, when the HTTP server 110 receives data, the data is copied from the socket buffer of the kernel memory to the user memory. Then, to send data, the data is copied from the user memory to the socket buffer of the kernel memory. Further, passing of data between the HTTP server 110 and the application executor 120 is performed using the kernel memory managed by the OS. Accordingly, every time data is passed from one to another, memory copy is performed twice between the user memory and the kernel memory.

To implement the mechanism for reducing the memory copy load, the present embodiment achieves high-speed processing as follows. Specifically, when an object in an HTML file has a frequently-used string, the string is replaced with information (pointer) for reference to a string file including that string. For example, when a very long string often used for a variable $x written in a PHP script is used, the string is not expanded there, but rewritten with a designation of information (URI) for reference to a string file pre-stored in a RAM disk or the like. Such implementation is transparent to the application program, and such replaced object has the same semantics as a regular string object. The content of the string file is acquired by the HTTP server 110. To request the HTTP server 110 to perform string file processing, the application executor 120 adds special header information to the header of a message sent from the application executor 120 to the HTTP server 110 according to the FastCGI protocol. This header information is called an "X-FileString header." What is described in the X-FileString header is a position of a file name written in the body part of the FastCGI message (an offset value indicating a position of a first letter of the file name, and the length of the file name). The HTTP server 110 specifies a file based on the X-FileString header, and sends the file to the client 200, using for example a sendfile system call of the OS.

Profiling

Figure 3:
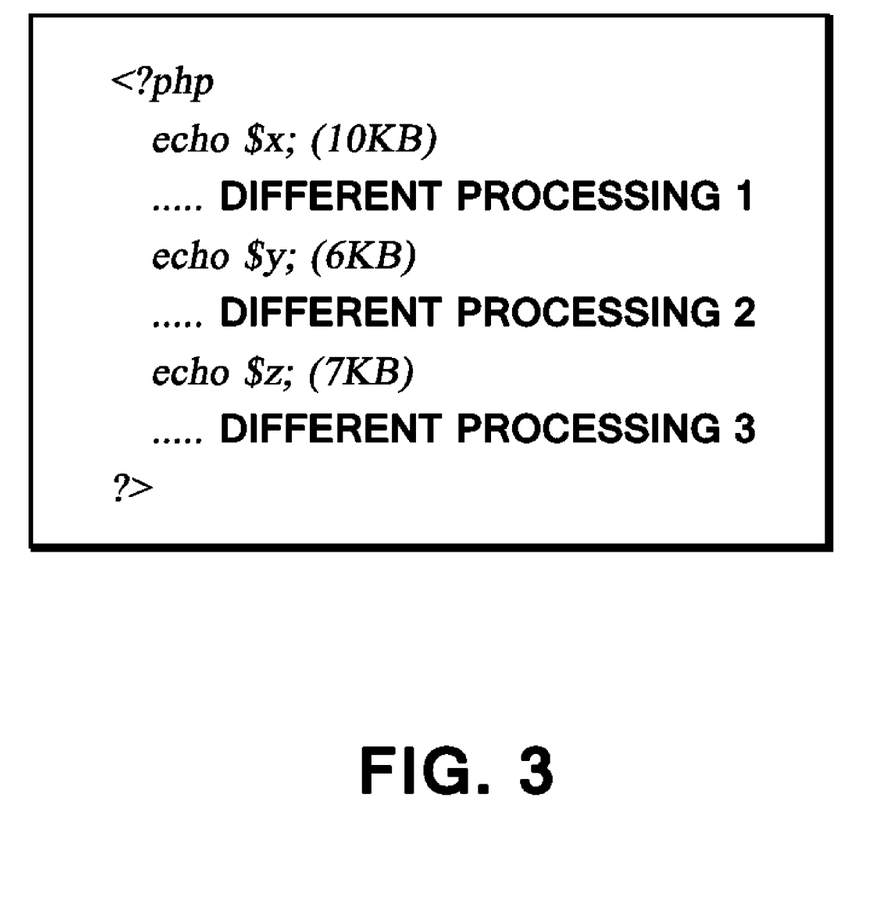
FIG. 3 is a diagram showing an example of a PHP script used in the present embodiment.

Use frequency information is obtained through profiling. When a variable for a string object is designated as an argument of an instruction code for string processing, statistical information on that string is obtained. The statistical information is the length, the number of appearances, or the like, of the string. When a string is passed between the HTTP server and the language processor, memory copy occurs multiple times. Processing a long string many times affects the overall performance of the web server. Taking a more concrete example of a PHP script, a procedure of data processing for profiling is described. FIG. 3 shows an example of a PHP script. This PHP script has a pattern often used in web applications, and is for displaying an almost-fixed message by an echo command (for producing standard output of a string). In the example in FIG. 3, the script has three messages. The application executor 120 first parses the PHP script, and translates it into instruction codes. Then, the application executor 120 executes the translated instruction codes. Here, when executing an instruction code corresponding to "echo", the application executor 120 determines whether the argument is a variable for a string object or not. If the variable is a string object, the application executor 120 records the string and takes statistics of that string.

For example, assume that an argument of the echo command is a variable $x that has taken four strings, aaaa, bbbb, cccc, and dddd (these strings are short here for descriptive purposes, but actually have several kilobytes). The application executor 120 records the four strings. If the string bbbb, of the four strings, has a use frequency higher than a preset value, the string is recorded with a specific name. As the preset value, an index, such as the number of times by which the string is used or a ratio of the string used among the four strings (e.g., 50% or more), is used. There are some possible timings for performing the profiling, such as when a ratio of memory copy occupying the CPU usage rate has exceeded a threshold (e.g., 5%), or during a designated time period, e.g., 8:00 to 12:00.

In the above example, for simplification, a use frequency is used as a criterion for creating a string file. It is also possible to use an evaluation function considering other parameters. Details of use of the evaluation function are described next.

Use of Evaluation Function

A description is given now of a case where the language processor of the application executor 120 uses an evaluation function when processing each echo command. A string file is created for a string whose score obtained by the evaluation function is equal to or higher than a preset value. The string file thus created is eventually sent to the user, using a sendfile system call of the OS.

$$Score=(MemoryCopy(size)-SystemCall-Compare(size))*Frequency)/size$$

where

Score: score size: the length (number of bytes) of a string assigned to an argument of an instruction code (echo)

MemoryCopy(size): cost for memory copy (memcpy function) (time: seconds)

SystemCall: cost for executing a system call (sendfile) (time: seconds)

Compare: cost needed for string comparison performed in execution of the instruction code (time: seconds)

Frequency: the number of appearances of the same string in the instruction code (echo).

When the memory copy cost is high, sendfile system call conversion produces a high effect, and therefore the numerator of the evaluation value Score becomes large. Since the overhead of the system call has to be considered, a constant value SystemCall is subtracted. In other words, if size is small and thereby the cost for memory cost is smaller than the cost for the system call, the score is negative. In such a case, Score is set to 0. Frequency indicates how frequently the echo command is executed in the instruction code. The higher the frequency, the higher the score is.

The reason of the division by size in the equation is that the larger the argument of the echo command, the more the memory is occupied. In other words, the reason is to consider a tradeoff between a memory footprint and a processing speed. The Compare function is a cost for string comparison performed in execution of the instruction code. The string comparison cost is smaller than a cost for memory copy between the user space and the kernel space and than a cost for a context switch. In a case of FastCGI for example, the Compare function is called twice when data is passed from the PHP language processor to the web server. Note that the location to store strings is preferably, but not necessarily, a memory disk (RAM disk) in consideration of speed.

Integration of Echo Statements

It is normal in a regular application that an echo statement is executed multiple times. For example, see the following PHP script:

<?php echo $x; echo $y; echo $z; ?>.

Now, assume that the variable $x has aaaa, the variable $y has bbbb, and the variable $z has cccc. The length of the string of each of these variables is short. However, if they are integrated to be echo $x. $y. $z, the string length becomes long. Then, the sendfile system call replacement is effective here. Accordingly, in the present invention, the strings are integrated in the following manner. The condition for integration of echo statements for optimization is that an echo command is executed twice or more successively. When an echo command is executed successively, the pattern that appears successively is recorded. For example, assume that x?, y?, z? are strings, and that each variable is expressed as follows.

$x=(x1, x2, x3)
$y=(y1, y2, y3)
$z=(z1, z2, z3)

Here, suppose that the following statistical information has been obtained through the profiling. The statistical information shows that a string combination appeared mostly in the patterns is ($x, $y, $z)=(x1, y2, z3). Then, the string, (x1, y2, z3), is stored as a string file, and the three echo statements are integrated. In execution of an instruction code, it is determined whether the variables $x, $y, $z are the string (x1, y2, z3) or not. If they are, using the string file previously generated, the file is sent using a sendfile system call. If they are not, the instruction code is executed as normal. Even when an evaluation value Score obtained for each of echo statements through an evaluation function is determined as being small, the echo statements are integrated with the above method. Thereby, a high effect is offered. In addition, overhead which would otherwise occur with multiple system calls can be eliminated.

Execution Processing Using Profiling Result

After the profiling, in execution of an echo command, it is determined whether an argument of the echo command is a string variable. Then, if the argument is a string variable, the value of the string variable is compared to a string stored as a string file to check whether they match. If they match, instead of writing out the string, the string is replaced with information (pointer) for reference to a string file previously generated through the profiling. To be more specific, the content of the string file is acquired by the HTTP server 110. To request the HTTP server 110 to perform processing for a string object, the application executor 120 adds special header information to the header of a message which is based on the FastCGI protocol and sent from the application executor 120 to the HTTP server 110.

This header information is called an "X-FileString header." What is described in the X-FileString header is a position of a file name written in the body part of the FastCGI message (an offset value indicating a position of a first letter of the file name, and the length of the file name). The HTTP server 110 specifies a file based on the X-FileString header, and sends the file to the client 200, using for example a sendfile system call of the OS. In the above example, the profiling and the processing performed using the profiling result have been described separately, but they can be performed at the same time. While performing profiling, the above-described processing may be performed as soon as a string file is created as a result of the profiling.

Now, a procedure of data processing using a profiling result is described, taking a concrete example of a PHP script. Upon receipt of a PHP script shown in FIG. 3, the application executor 120 first parses the PHP script and translates it into instruction codes. Then, the application executor 120 executes the translated instruction codes. Here, when executing an instruction code corresponding to an echo command, the application executor 120 determines whether the variable is a string object or not.

Then, if the variable is a string object, the application executor 120 determines whether the string object matches any string file created through profiling. If there is a string file that matches the string object, the string object is replaced with an URI which is reference information for reference to the name of the string file (e.g., /tmp/str_0001.HTML). In addition, the application executor 120 writes an X-FileString header as header information for a FastCGI packet, to designate an offset value indicating the position and the length of the file name in the FastCGI packet.

Thereafter, the FastCGI packet generated by the application executor 120 is sent to the HTTP server 110 and is processed there. The HTTP server 110 parses the header of the FastCGI packet thus received. Finding the X-FileString header in the header, the HTTP server 110 does not pass the FastCGI packet to the socket, but returns the file designated by the X-FileString header, to the client 200 by using a sendfile system call.

As described, according to the present embodiment, memory copy which would be otherwise needed for the application executor 120 to acquire a file is omitted, and memory copy which would normally performed when a FastCGI packet is sent from the application executor 120 to the HTTP server 110 is not performed. Moreover, when the HTTP server 110 returns an HTTP response to the client 200, the file is sent to the client 200 not through the user memory, but directly from the kernel memory. Accordingly, processing cost is reduced by the amount of memory copy of the file thus omitted, allowing an improvement in the operation performance of the web application server 100.

Functions Provided by Libraries and Operations of Application Executor

Next, detailed descriptions are given of the functions provided by the runtime 121 and the extension library 122 and of operations of the application executor 120.

Through the HTTP server 110, the application executor 120 acquires an HTTP request from the client 200, and in response to the HTTP request, dynamically generates an HTML file to be sent as an HTTP response. In generating the HTML file, the application executor 120 uses the runtime 121 and the extension library 122 to execute a PHP script written in an original HTML file to be sent as the HTTP response.

Figure 4:
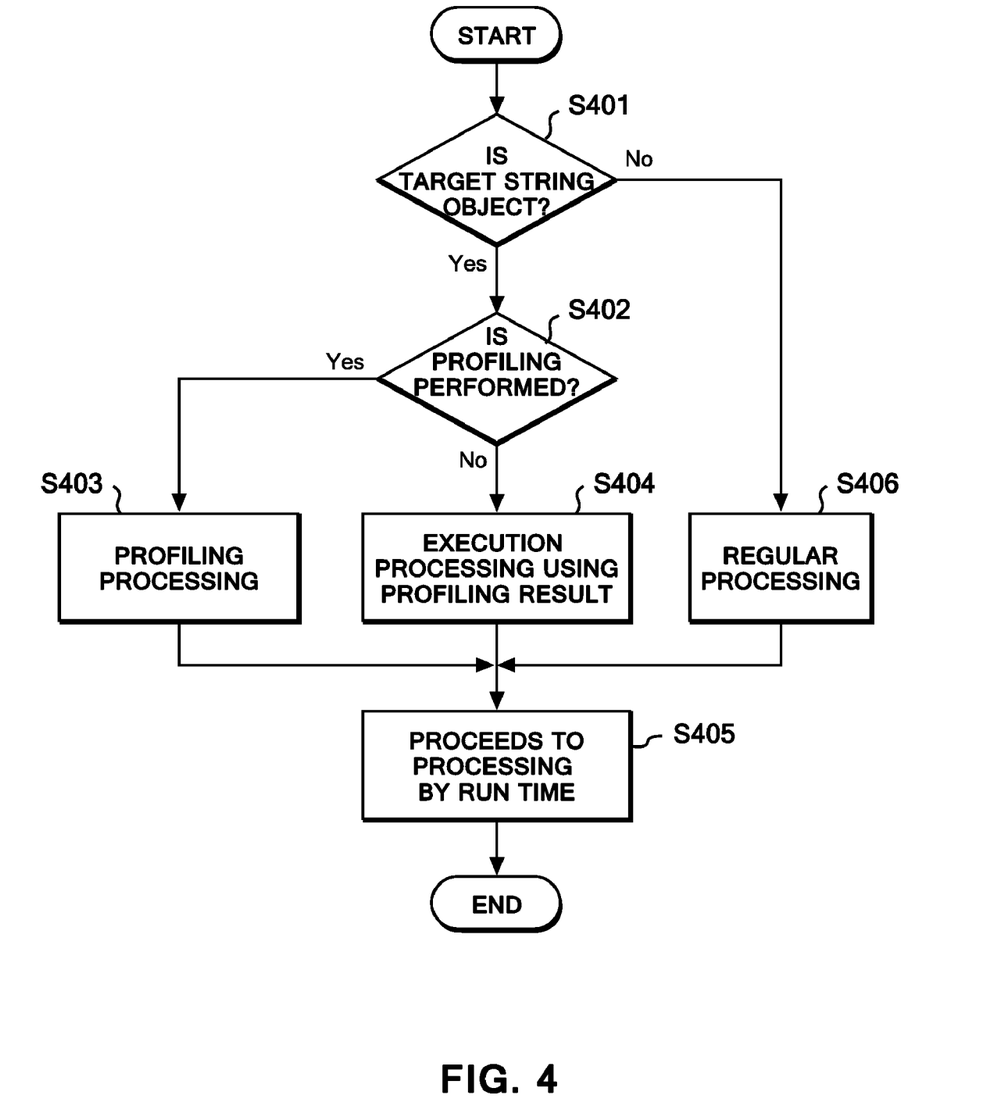
FIG. 4 is a flowchart showing operations of an application executor using an extension library of the present embodiment.

FIG. 4 is a flowchart showing the operations of the application executor 120 using the extension library 122. The application executor 120 acquires an instruction code of the PHP script sequentially, and uses the extension library 122 to perform processing for the instruction code. Referring to FIG. 4, the application executor 120 first determines whether an instruction code to be processed is a string object or not (S401). Whether the processing target is a string object or not can be determined based for example on a function in the instruction code. A specific instruction code or function by which the processing target is determined as a string file may be defined in advance. If the processing target is not a string object, the application executor 120 performs, as necessary, processing similar to processing performed by a regular PHP language processor using the extension library 122 (S406).

If the processing target is a string object, the application executor 120 determines whether to perform profiling. In the determination, if a flag indicating that profiling processing has been completed is set, the application executor 120 proceeds to execution processing (S404). If the profiling processing completion flag is not set, the application executor 120 proceeds to profiling processing (S403).

A detail flow of each of the profiling processing (S403) and the execution processing (S404) will be described later. After completion of the execution processing (S404) or after completion of the profiling processing (S403), the application executor 120 proceeds to processing performed by the runtime 121 (S405).

Flow of Profiling Processing

Figure 5:
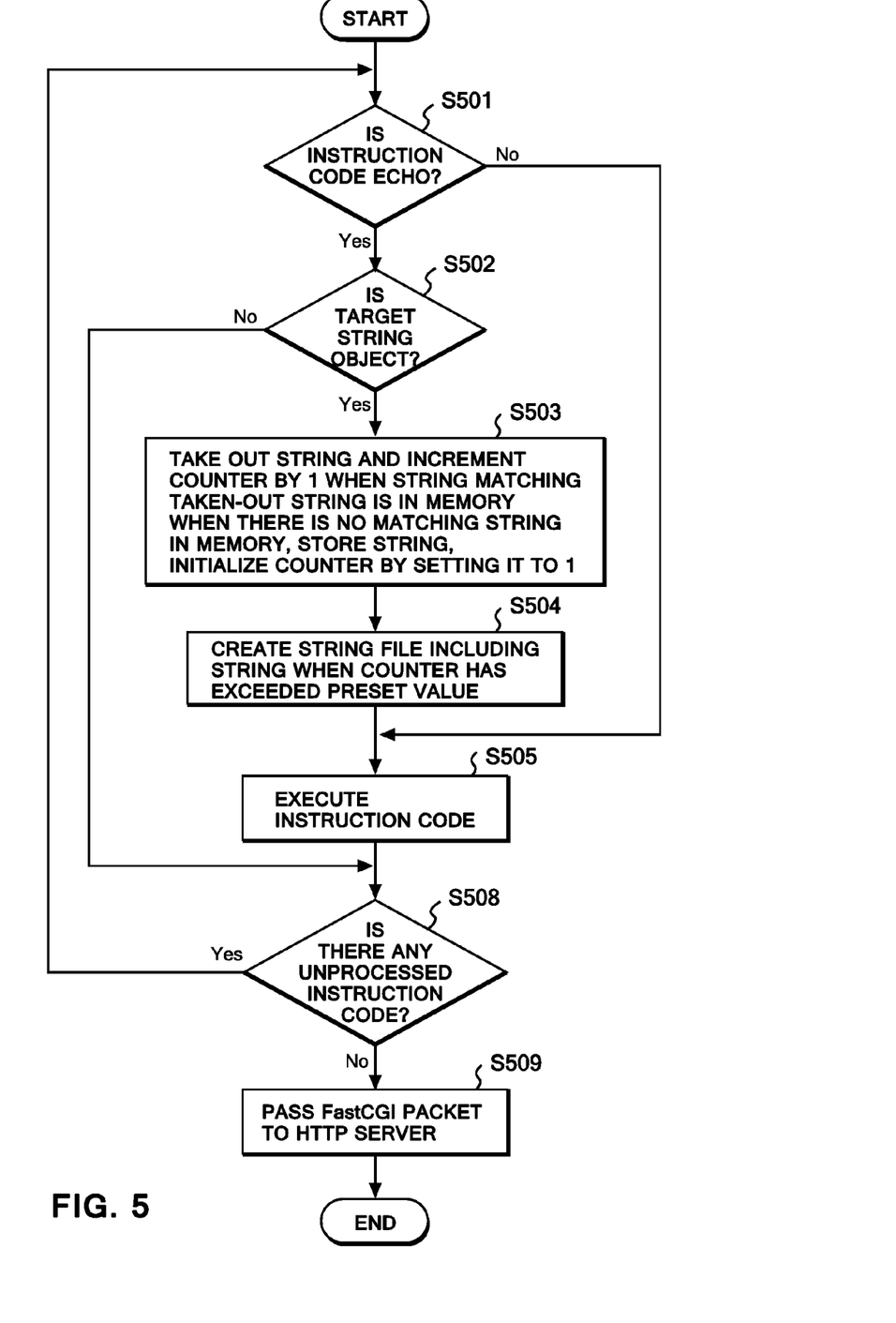
FIG. 5 is a flowchart of profiling processing of the present embodiment.

FIG. 5 shows a detailed flowchart of profiling. First, the application executor 120 determines whether the instruction code is "echo" or not (S501). If the instruction code is not "echo", the application executor 120 executes the instruction code (S505). In the processing described in the present invention, "echo" is shown as an example of an instruction code for displaying a string. However, processing similar to that performed for "echo" can be used for other string processing codes. Next, the application executor 120 determines whether the echo command to be processed is a string object or not (S502). If the processing target is not a string object, the next unprocessed code is processed (S508). If the processing target is a string object, the application executor 120 takes out the string, and checks whether a string appearance table has a string that matches the taken-out string or not.

Figure 10:
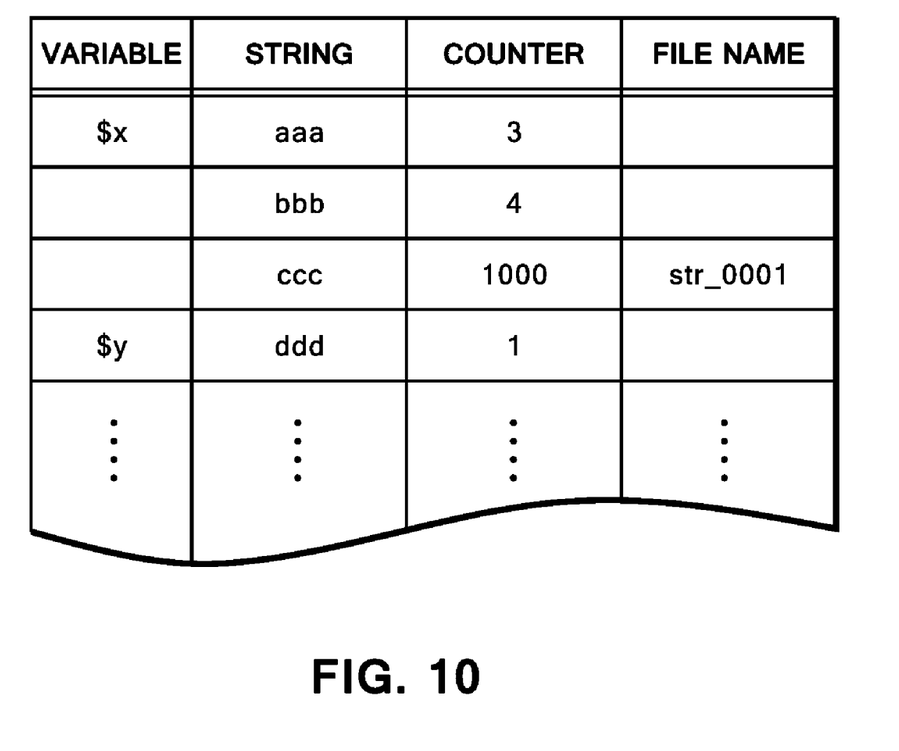
FIG. 10 is a diagram illustrating a string appearance table of the present embodiment.

As shown in FIG. 10, the string appearance table stores a variable, a string that has been previously taken by the variable, the number of appearances of the string, and a file name given to a file when the string is stored as a string file. Having a file name in the file name field means that a corresponding string has been stored as a string file. Accordingly, the file name field can be used as a flag indicating whether the string has been stored as a string file or not.

In the example in FIG. 10, the table records that a variable $x has taken a string bbbb four times before. If the variable $x concerned takes bbbb, the counter for the string bbbb is incremented by 1 and is thus set to 5. If the value of the variable $x is a string xxxx which has never been recorded before, the string xxxx and 1 as a counter value for the string xxxx are recorded in the string appearance table. When the counter value of a certain string exceeds a predetermined value (e.g., 1000), the certain string is recorded as having a file storing the string.

In FIG. 10, it can be seen that the string cccc has already been stored as a string file. For example, assume that the string bbbb for the variable $x is recorded as having been appeared 999 times. When the variable $x concerned takes bbbb, the counter becomes 1000, and therefore the string bbbb is stored as a string file (S504). A file name is set for the filed string. The counter is incremented no more when the counter value is at the preset value. The file names of created files are determined in the order they are created (such as str_0001 and str_0002). Alternatively, created files may be recorded with names determined uniquely based on the content of the string, using a hash function.

After completion of string filing, the application executor 120 performs regular processing for the instruction code, and then processes the next unprocessed code (S508). When a particular condition is satisfied, the application executor 120 sets a flag indicating completion of profiling. Specifically, the profiling completion flag is set when: the size of the string appearance table exceeds its maximum size; the number of files exceeds an upper limit; memory storing strings reaches an upper limit; when the current time exceeds a designated time; or the like. To generate files with more accuracy, the value of Score described in the paragraphs on the use of an evaluation function is used instead of the number of appearances.

Flow of Execution Processing Using Profiling Result

Figure 6:
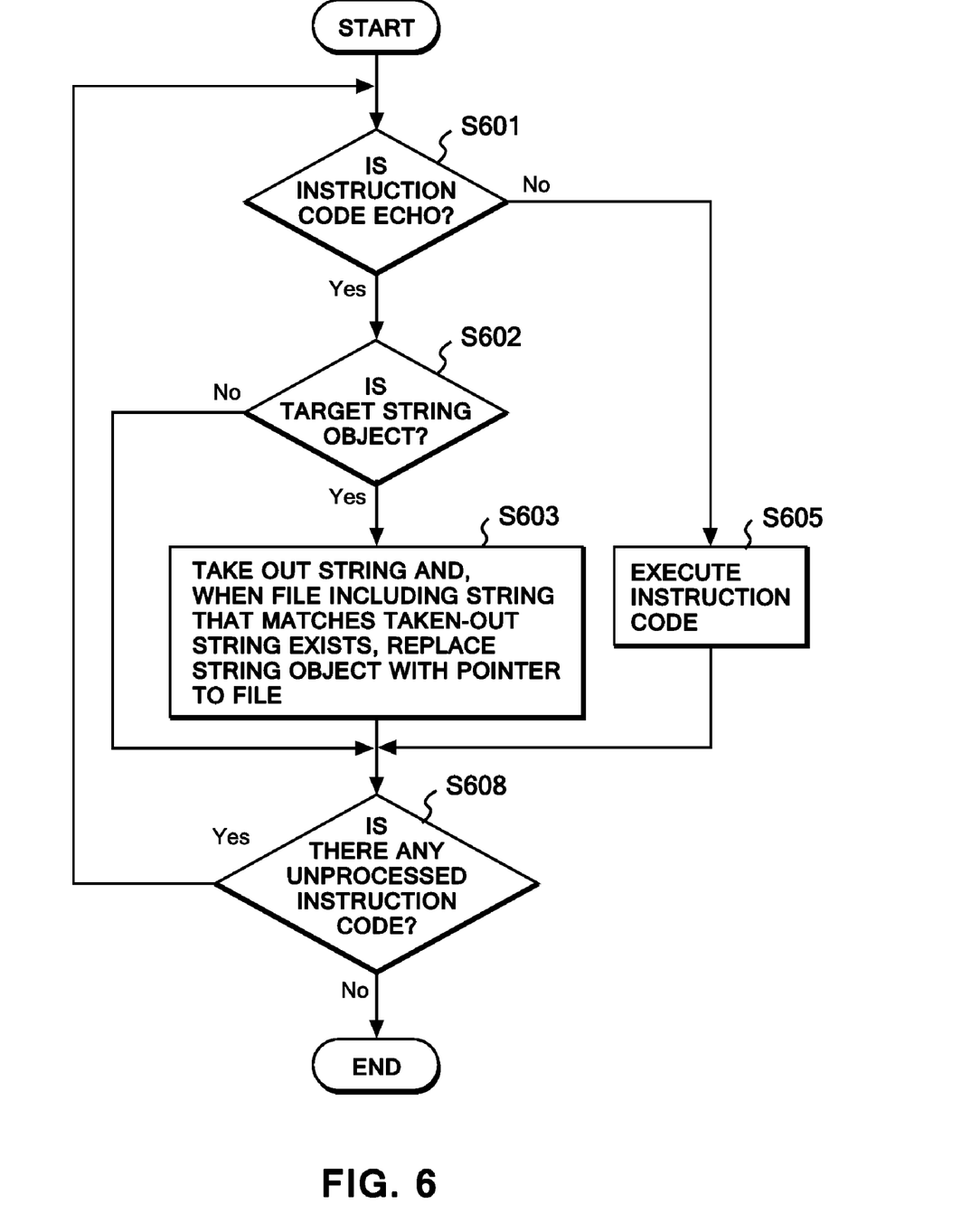
FIG. 6 is a flowchart of execution processing according to the present embodiment.

FIG. 6 shows a detailed flowchart of the execution processing. First, the application executor 120 determines whether an instruction code is "echo" or not (S601). If the instruction code is not "echo", the application executor 120 executes the instruction code (S605). In the processing described in the present invention, "echo" is shown as an example of an instruction code for displaying a string. However, processing similar to that performed for "echo" can be used for other string processing codes. Next, the application executor 120 determines whether a processing target of an echo command to be processed is a string object or not (S602). If the processing target is not a string object, the next unprocessed code is processed (S608).

If the processing target is a string object, the application executor 120 takes out the string, and checks whether a string appearance table stores a string that matches the taken-out string or not. If there is no matching string in the string appearance table, no processing is performed. If there is any matching string, the application executor 120 refers to the last field of that matching string to check whether a file name is described there. Having a file name in the file name field means that the string has been stored as a string file. In this case, the application executor 120 replaces the designated string object with information (URI) for referring to the file.

Figure 9:
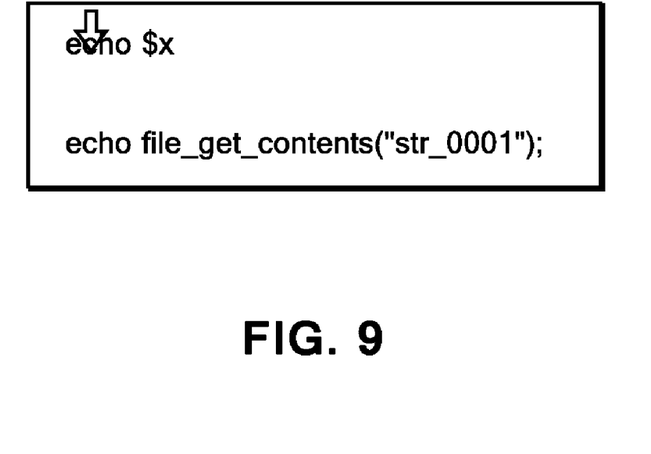
FIG. 9 is a diagram showing an example of replacement of a variable, according to the present embodiment.

For example, assume that the variable for "echo" is $x taking a string cccc. The application executor 120 refers to the string appearance table in FIG. 10 and finds out that the file name is str_0001. Then, as shown in FIG. 9, the application executor 120 replaces the string with information for referring to the filed string. Note that a fixed directory (e.g., /tmp/) for storing the string file is set in advance. When a file name is not described in the string appearance table, the string has not been stored as a string file. Accordingly, the application executor 120 performs no processing on the string. After completion of the replacement processing, the application executor 120 processes the next unprocessed code (S608).

Processing By Runtime

Figure 8:
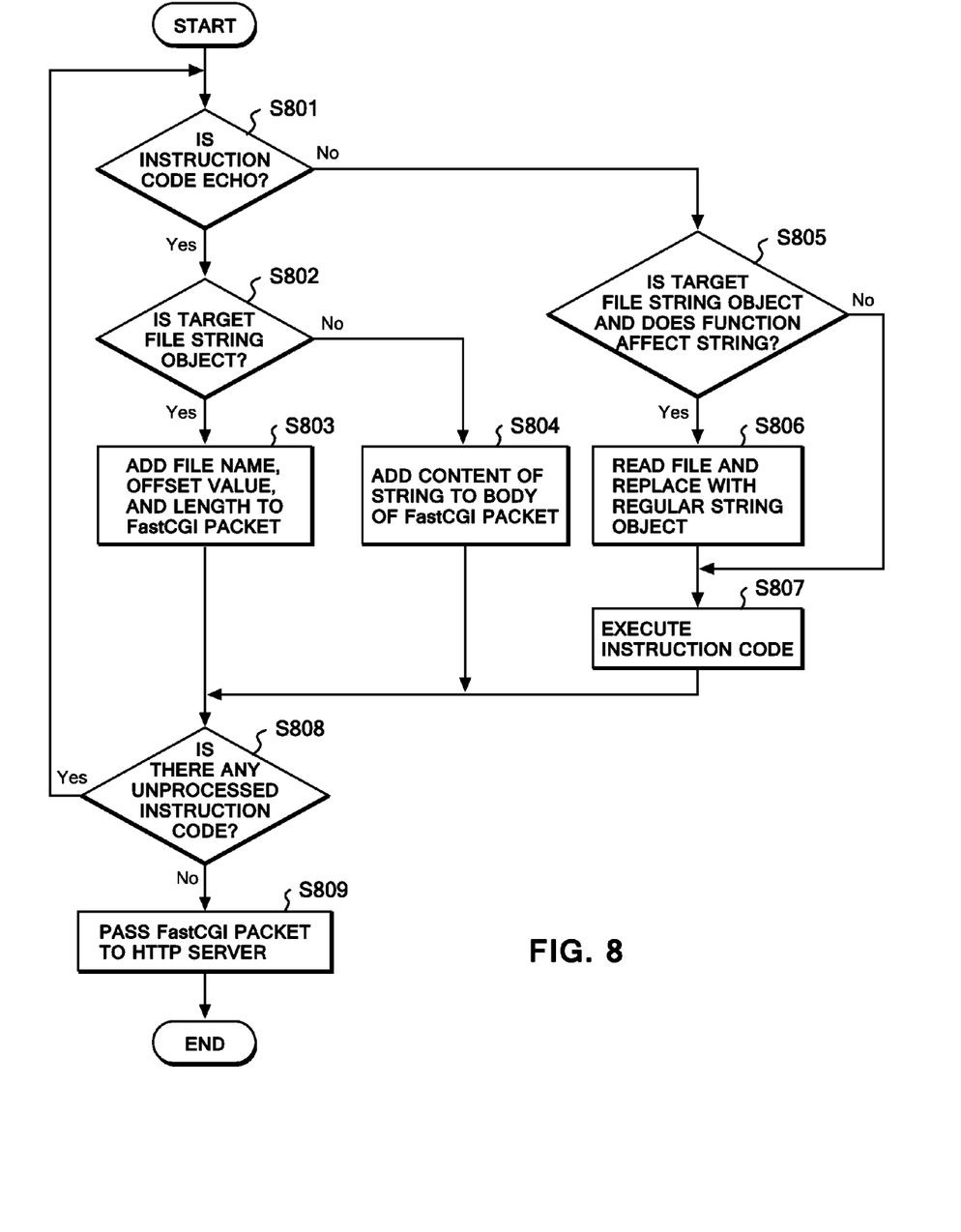
FIG. 8 is a flowchart showing operations of a runtime according to the present embodiment.

FIG. 8 is a flowchart showing operations of the application executor 120 using the runtime 121. Referring to FIG. 8, the application executor 120 sequentially acquires an instruction code having been processed using the extension library 122. Then, the application executor 120 determines whether the instruction code is "echo" or not (S801).

When the instruction code is "echo", the application executor 120 next determines whether a processing target object is a string file or not (S802). When the object is determined as a string file, the application executor 120 next adds a file name to the body part of a FastCGI packet used as an SAPI. The file name is included in the object. In addition, the application executor 120 adds an offset value indicating the position of the file name and the length of the file name, to the X-FileString header of the FastCGI packet (S803). Here, information pieces on a hard link (a link name and the length of the link name) generated by the extension library 122 are also added to the body part and the X-FileString header of the FastCGI packet, respectively. The format of the X-FileString header is for example as follows:

X-FileString: offset value/file name length/link name length

Taking a concrete example where $x in echo$x is replaced with information (pointer) for reference to a string file str__0001 and where the offset is 0 and preset directory for the string file is /tmp/, the header part and the body part look like as follows.

header part
X-FilesString: 0/19/23
body part
/tmp/str__0001.HTML/tmp/str__0001.HTML-link When, on the other hand, the processing target object is determined as being not a string file but a regular string object in Step 802, the application executor 120 next adds the content of the string to the body part of the FastCGI packet (S804).

When the acquired instruction code is not "echo" in Step 801, the application executor 120 next determines whether the processing target object is a string file and a function to be executed affects the string or not (S805). Here, the function that affects a string is for example a function trim for removing a blank from a string. Functions that affect a string may be defined in advance.

When the object is a string file, and the function is a function that affects the string, the application executor 120 next reads a processing target file, and replaces the string file with a regular string object (S806). Then, the application executor 120 executes the instruction code acquired in Step 801, and creates a FastCGI packet (S807). For example, with a PHP script such as the following, the application executor 120 actually loads a file and performs processing on the file as a regular string object.

When, on the other hand, the object is not a string file or the function does not affect the string, the application executor 120 executes the instruction code acquired in Step 801 without performing any special processing for it, and creates a FastCGI packet (S807). In other words, even when the object is a string file, when the function does not affect the string, the instruction code is executed without reading a processing target file.

After the FastCGI packet is created in Step 803, 804, or 807, the application executor 120 checks if there is any unprocessed instruction code (S808). Then, the processing from Steps 801 to 807 is sequentially performed on each of the instruction codes of the PHP script. After processing all the instruction codes, the application executor 120 passes the created FastCGI packet to the HTTP server 110 through a communication channel (SAPI) (S809).

Operations of HTTP Server

Next, a description is given of operations of the HTTP server 110 performed for the HTML file generated by the application executor 120 as above.

A basic operation of the HTTP server 110 is to return the HTML file generated by the application executer 120 to the client 200, as an HTTP response to the received HTTP request. Here, when the instruction code in the PHP script of the HTML file is "echo", the content of the file designated by the object needs to be sent to the client 200 along with the HTML file. However, in the present embodiment, as described above, the application executor 120 has not read the file to be sent, and therefore the content of the file is not embedded in a corresponding object in the HTML file. Accordingly, the HTTP server 110 reads the file to be sent, from the storage 140, and sends the file to the client 200 along with the HTML file.

Figure 7:
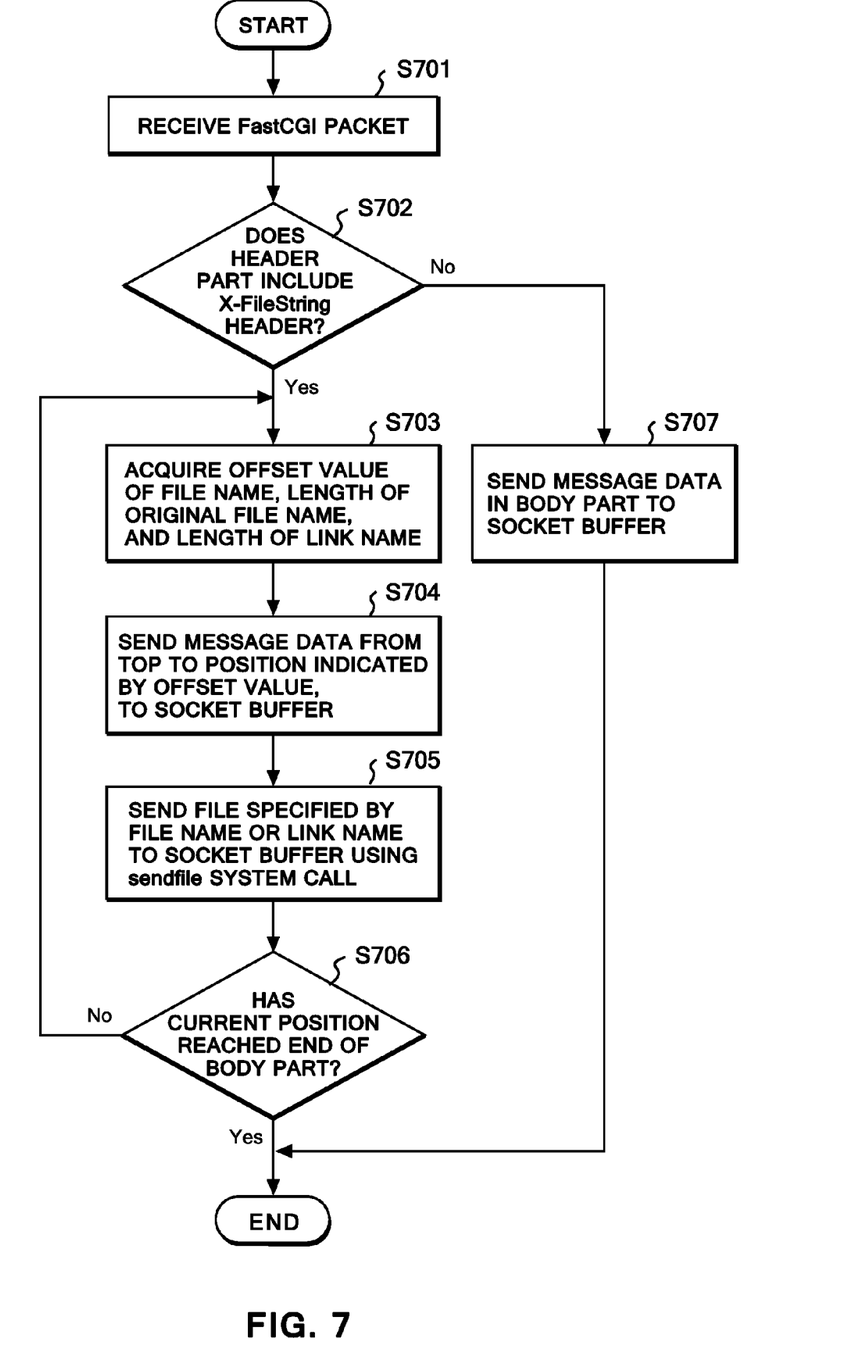
FIG. 7 is a flowchart showing data processing operations performed by an HTTP server when sending an HTML file, according to the present embodiment.

FIG. 7 is a flowchart showing data processing operations performed by the HTTP server 110 when sending an HTML file.

As shown in FIG. 7, upon receipt of a FastCGI packet from the application executor 120 (S701), the HTTP server 110 determines whether the header part of the FastCGI packet includes an X-FileString header or not (S702). When the header part includes an X-FileString header, the HTTP server 110 executes a series of the following processing steps (S703 to S706).

First, the HTTP server 110 acquires an offset value of a file name, the length of the file name, and the length of a link name that are described in the X-FileString header of the FastCGI packet (S703). Next, the HTTP server 110 checks through the body part of the FastCGI packet from the top, and sends, to the socket buffer, message data described from a current position (initially, the top position) to the position indicated by the offset value acquired in Step 703 (S704).

Next, the HTTP server 110 acquires a file name and a link name described in the body part of the FastCGI packet, based on the length of the file name and the length of the link name acquired in Step 703. Then, using a sendfile system call, the HTTP server 110 sends a file specified by the file name or the link name, to the socket buffer (S705). Here, using the file name, the link name, and a stat system call, the HTTP server 110 checks whether the target file has been updated.

If the file has been updated, the HTTP server 110 sends a file specified by the link name (a copy file generated by the application executor 120 with the extension library 122) to the socket buffer. In this processing, the HTTP server 110 sends the file using a sendfile system call. Accordingly, the target file is read from the storage 140 and stored in a file buffer in the kernel memory, and then sent directly to the socket buffer. In other words, the file is not copied from the user memory used by the application of the HTTP server 110 to the kernel memory provided with the socket buffer.

Thereafter, the HTTP server 110 determines whether the current check position in the body part of the FastCGI packet has reached the end of the body part (S706). If the current position has not reached the end of the body part, the processing returns to Step 703 to repeat the processing in Steps 703 to 705.

When the current check position has reached the end of the body part, the data processing by the HTTP server 110 ends. When determining, in Step 702, that the header part of the FastCGI packet does not include an X-FileString header, the HTTP server 110 performs no special data processing, and sends message data described in the body part of the FastCGI packet, to the socket buffer (S707).

The HTTP server 110 sends the data sent to the socket buffer as described above, to the client 200 as an HTTP response.

The above operations are described with a concrete example of a FastCGI packet. A file is sent to the socket buffer, based on a string file name "/tmp/str__0001.html" or on a link name "/tmp/str__0001.html-link" (see Step 705 in FIG. 7). Then, if the current check position has not reached the end of the body part yet, the processing in and after Step 703 is repeated, and a message to the position of the offset is sent to the socket buffer (S704).

The present embodiment has been described above, but the technical scope of the present invention is not limited to the embodiment described above. For example, the application executor 120 is a PHP language processor in the above embodiment, but may be a different processer that can write a script in an HTML file. In addition, a communication channel (SAPI) between the HTTP server 110 and the application executor 120 is FastCGI in the present embodiment, but may be a different SAPI such as mod_php. It is apparent from the scope of claims that various changes, modifications, and improvements made to the above embodiment are also included in the technical scope of the present invention.

According to the present invention having the above configuration, in dynamic generation of an HTML file, a frequently-appearing string is stored as a file, and the file is used in a response to the HTTP request. Accordingly, the processing costs of memory copy can be reduced, thereby improving the operation performance of the web application server.

In addition, the server can be configured so that when an instruction code for processing the string exists successively, the successive strings are stored as one string file.

Additionally, the server can be configured so that the number of appearances is a function value based on: the length of a string assigned to an argument of an instruction code; time needed for memory copy; time needed for a system call; time needed for string comparison performed in execution of the instruction code; and the number of appearances of the string.

Although the preferred embodiment of the present invention has been described in detail, it should be understood that various changes, substitutions and alternations can be made therein without departing from spirit and scope of the inventions as defined by the appended claims.

What is claimed is:

1. A server apparatus that generates an HTML file upon receipt of an HTTP request, the server comprising:
   an application executor device that generates the HTML file based on the HTTP request; and
   an HTTP server device that receives the HTTP request and sends an HTTP response to the HTTP request, the HTTP response including the HTML file generated by the application executor device, wherein:
   the application executor device includes means for executing a script in generating the HTML file, for calculating the number of appearances of the string when an instruction code in the script is a command for processing a string, and for storing the string in a storage as a string file when the use frequency score of the string is higher than a preset value, the application executor device further includes means for executing a script in generating the HTML file and replacing the string with reference information for reference to the string file when (i) an instruction code of the script is a command for processing a string and (ii) when the string matches the stored string, and
   the HTTP server includes means for sending the string file indicated by the reference information along with the HTML file when the HTML file generated by the application executor includes the reference information for reference to the string file;
   wherein the use frequency score of the string is a function value based on:
   the length of a string assigned to an argument of an instruction code; time needed for memory copy; time needed for a system call; time needed for string comparison performed in execution of the instruction code; and the number of appearances of the string.

2. The server according to claim 1, wherein when an instruction code for processing the string exists successively, the successive strings are stored as one string file.

3. The server according to claim 1, wherein the function value (Score) is obtained by the following equation:

Score =(MemoryCopy(size)−SystemCall−Compare (size))* Frequency)/size, where size: the length of a string assigned to an argument of an instruction code (the number of bytes), MemoryCopy (size):time needed for memory copy (seconds), SystemCall:time needed for execution of a system call (seconds), Compare:time needed for string comparison performed in execution of the instruction code (seconds), and Frequency: the number of appearances of the string.

4. A method for sending an HTTP response in a server that generates an HTML file upon receipt of an HTTP request, the method comprising the steps of:
   executing a script in generating the HTML file;
   calculating the use frequency score of the string when an instruction code in the script is a command for processing a string;
   storing the string in a storage as a string file when the use frequency score of the string is higher than a preset value;
   executing a script in generating the HTML file when an instruction code of the script is a command for processing a string;
   replacing the string with reference information for reference to the string file when the string matches the stored string, thereby generating the HTML file; and
   sending the string file indicated by the reference information along with the HTML file when the generated HTML file includes reference information for reference to the string file;
   wherein the use frequency score of the string is a function value based on:
   the length of a string assigned to an argument of an instruction code; time needed for memory copy; time needed for a system call; time needed for string comparison performed in execution of the instruction code; and the number of appearances of the string.

5. A program embodied on a non-transitory medium for sending an HTTP response in a server that generates an HTML file upon receipt of an HTTP request, the program causing the server to execute the steps of:
   executing a script in generating the HTML file, and
   when an instruction code in the script is a command for processing a string, calculating the use frequency score of the string, and storing the string in a storage as a string file when the use frequency score of the string is higher than a preset value;
   executing a script in generating the HTML file, and
   when an instruction code of the script is a command for processing a string, and when the string matches the stored string, replacing the string with reference information for reference to the string file, and thus generating the HTML file; and
   when the generated HTML file includes reference information for reference to the string file, sending the string file indicated by the reference information along with the HTML file;
   wherein the use frequency score of the string is a function value based on:
   the length of a string assigned to an argument of an instruction code; time needed for memory copy; time needed for a system call; time needed for string comparison performed in execution of the instruction code; and the number of appearances of the string.

* * * * *